(12) United States Patent
Nakanishi et al.

(10) Patent No.: US 6,590,622 B1
(45) Date of Patent: Jul. 8, 2003

(54) TRANSPARENT TOUCH PANEL ELECTRONIC APPARATUS USING THE SAME

(75) Inventors: Akira Nakanishi, Osaka (JP); Toshiharu Fukui, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/484,842

(22) Filed: Jan. 18, 2000

(30) Foreign Application Priority Data

Jan. 18, 1999 (JP) .......................................... 11-008785

(51) Int. Cl.[7] .......................... G02F 1/1333; G09G 3/36
(52) U.S. Cl. ...................... 349/12; 349/122; 345/104; 345/173
(58) Field of Search .................... 349/12, 137, 122, 349/158; 345/104, 173, 174, 175, 179

(56) References Cited

U.S. PATENT DOCUMENTS

| | | | | |
|---|---|---|---|---|
| 4,527,862 A | * | 7/1985 | Arakawa | 349/12 |
| 4,901,074 A | | 2/1990 | Sinn et al. | |
| 6,088,069 A | * | 7/2000 | Farlow | 349/12 |
| 6,204,896 B1 | * | 3/2001 | Matsuhira et al. | 349/12 |
| 6,490,012 B1 | * | 12/2002 | Takatani | 349/12 |
| 6,507,337 B1 | * | 1/2003 | Sato et al. | 345/173 |

* cited by examiner

Primary Examiner—Toan Ton
(74) Attorney, Agent, or Firm—RatnerPrestia

(57) ABSTRACT

A transparent touch panel (TTP) comprising a fixed substrate of transparent resin, an adhesion layer disposed on the fixed substrate, an antireflection layer disposed on the adhesion layer, a first transparent conductive layer disposed on the antireflection layer, a second transparent conductive layer opposed to and spaced apart from the first transparent conductive layer, and a flexible transparent film disposed on the upper surface of the second transparent conductive layer. In one embodiment, rather than having a separate adhesion layer and antireflection layer, the adhesion layer may also serve as the antireflection layer, the rest of the above components remaining the same. The use of transparent resin in the TTP of the present invention reduces weight and increases resistance to breaking. The antireflection layer decreases the light reflection at respective boundary surfaces, thus increasing light transmittance. The adhesion layer strengthens adhesion of the antireflection layer and the first transparent conductive layer onto the fixed substrate, thus providing for even and uniform electrical resistance in the transparent conductive layer. An electronic apparatus thus comprises at least a control circuit, an LCD device for display, and a TTP disposed on the display surface of the LCD device. The TTP may comprise the TTP described above and/or may comprise a polarizing plate on an operating surface of the transparent touch panel.

16 Claims, 5 Drawing Sheets

(PRIOR ART)

TRANSPARENT TOUCH PANEL ELECTRONIC APPARATUS USING THE SAME

FIELD OF THE INVENTION

The present invention relates to a transparent touch panel attached on the display surface of a display device such as an LCD (liquid crystal display), a CRT (cathode ray tube), a plasma display, or the like, as well as to an electronic apparatus using the transparent touch panel. The touch panel is used to input control signals into an electronic apparatus by a user pressing a certain specific region of the display surface corresponding to the signal with a pen or a finger.

BACKGROUND OF THE INVENTION

A transparent touch panel (hereinafter referred to as a "TTP") of the prior art is described below with reference to FIG. 7, which shows a sectional view of a conventional TTP. In FIG. 7, a first transparent conductive layer 2, typically made mainly of indium tin oxide (hereinafter referred to as "ITO"), is formed, typically by a sputtering process, on the upper surface of a fixed substrate 1, typically made of glass. Provided on the first ITO layer 2 is a very small dot spacer 3, typically made of an insulating epoxy resin or the like, disposed at regular intervals. The ITO layer 2 is provided at the perimeter edge with an insulating pattern 4 of a certain specific width. Above the first ITO layer 2, a movable substrate formed of a transparent film, etc. having a second transparent conductive layer 5, typically ITO, on the bottom surface, is provided opposing first ITO layer 2, with insulating pattern 4 interposed between the surfaces. The upper surface of movable substrate 6 is covered with a hard coating layer 7 for protecting movable substrate 6 from getting scratched by a pressing pen or finger. Normally, the surface of movable substrate 6 having said hard coating film 7 is used as the operating surface of a TTP. The first ITO layer 2 and the second ITO layer 5 are connected with an outside circuit (not shown) through a circuit pattern 8A formed on a flexible circuit board 8, via a connection section 9, typically made of silver paste.

Operation for inputting a control signal is conducted by pushing movable substrate 6 from above in a designated position such that first ITO layer 2 and second ITO layer 5 make contact. Regions not intended for contact between layers 2 and 5 are separated by the dot spacers 3 so that no control signal input can be made from such regions. The location of the designated position is identified by the electrical resistance ratio in the first ITO layer 2 and the second ITO layer 5. In particular, the designated position is identified by an outside circuit that detects the voltage ratio when there is contact at the designated position. The resistance is measured by applying a certain specific voltage on first ITO layer 2 and second ITO layer 5 via electrodes 10A and 10B provided at both edges of the respective layers, as shown in FIG. 8.

A conventional TTP configured above using a glass plate for the fixed substrate 1, however, has various drawbacks. For example, because glass has a large specific gravity, it is relatively heavy, and furthermore, glass is easily breakable by an excessive load or a shock.

In order to evade such drawbacks, transparent resins have been tried for fixed substrate 1. An ITO layer formed on a plastic substrate, however, also has drawbacks. One drawback is that the ITO layer poorly adheres to the plastic substrate. Another problem is that the light transmittance of a TTP with a plastic substrate is relatively less than the light transmittance of a TTP with a glass substrate. The poor adhesion of the ITO layer onto the plastic substrate may lead to a broken ITO layer after repetitive use of the TTP, or to the ITO layer peeling off from the substrate. Even if the ITO layer does not peel off, uniformity in resistance of the ITO layer may deteriorate after repetitive use of the TTP.

For improving the transmittance, it has been a common practice to form a multi-layered film of inorganic compounds over the transparent plastic substrate, such as by sputtering or vacuum deposition. This increases the manufacturing cost of a TTP, however, and additionally requires expensive production facilities for manufacture of large area TTPs. Furthermore, the adhesion of the multi-layered inorganic film onto the plastic substrate is poor.

The present invention addresses the drawbacks described above, and aims to offer a TTP that is lightweight and not easily breakable. The present invention also offers an electronic apparatus using such a TTP.

SUMMARY OF THE INVENTION

A TTP of the present invention comprises:

a fixed substrate comprising transparent plastic, an adhesion layer disposed on the fixed substrate, an antireflection layer disposed on the adhesion layer, a first transparent conductive layer, such as ITO, disposed on the antireflection layer, a second transparent conductive layer, such as ITO, provided opposed to the first transparent conductive layer and spaced therefrom, and a flexible transparent film provided on the upper surface of the second transparent conductive layer.

Because the TTP of the present invention uses a plastic fixed substrate, it is lightweight and does not break easily. The antireflection layer provided between the fixed substrate and the first ITO layer reduces the reflection of light incident to respective boundary surfaces between the fixed substrate and the first ITO layer, thus improving light transmittance. Furthermore, the adhesion layer supports the tight adhesion of the antireflection layer and the first ITO layer onto the fixed substrate, providing uniform electrical resistance in the ITO layer. Thus the present invention provides a TTP that is superior in visibility, in durability against repetitive input operations, and that has superior positional accuracy.

DESCRIPTION OF THE PREFERRED EMBODIMENTS

Figure 1:
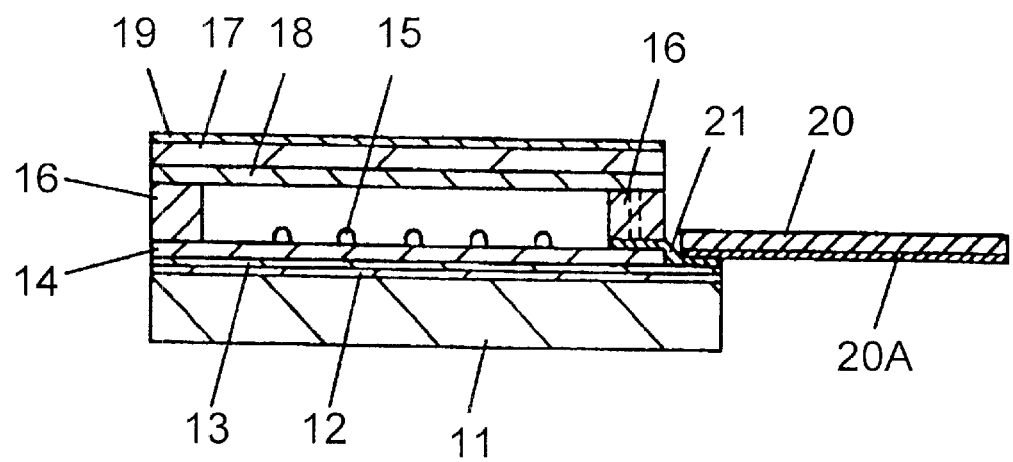
FIG. 1 is a sectional view of a TTP in a first exemplary embodiment of the present invention.

Exemplary embodiments of the present invention are described hereunder referring to the drawings. Each of the drawings has been shown magnified in the direction of thickness for an easier illustration of the structure.

First Embodiment

Figure 2:
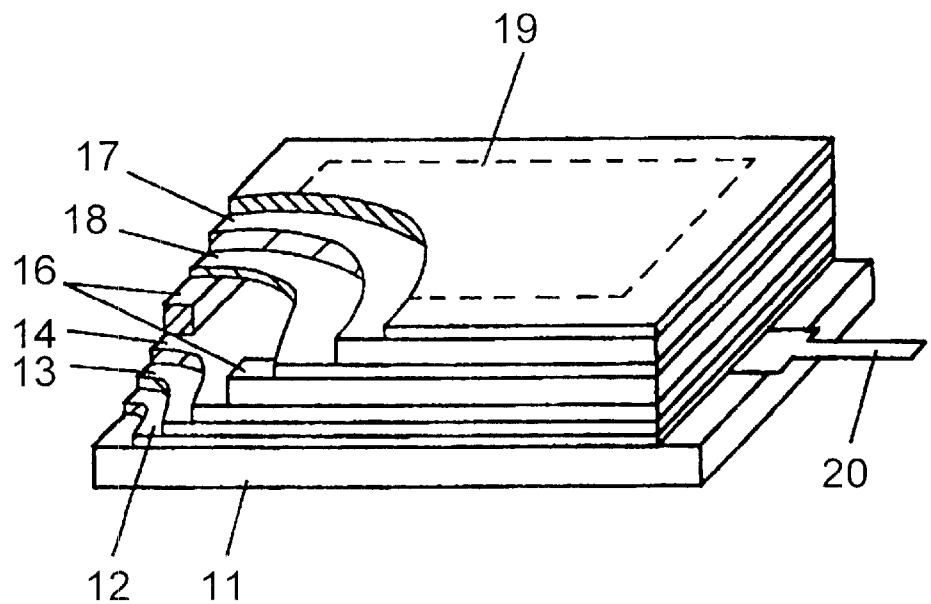
FIG. 2 is a partially cutaway perspective view of the TTP of FIG. 1.

FIG. 1 shows a cross sectional view of a TTP in a first exemplary embodiment of the present invention. FIG. 2 is a perspective view of a TTP shown partially cut away. In FIG. 1, a first adhesion layer 12 is provided on the upper surface of substrate 11, such as a polycarbonate substrate about 1.0 mm thick. The first adhesion layer 12 is a highly adhesive layer, such as an epoxy modified acrylic resin, for example formed by printing an epoxy acrylate ink and curing it. First adhesion layer 12 has adhesive properties on both the upper and lower surfaces of the adhesive layer so that the adhesion layer adheres well to substrate 11 and other layers adhere well to it. All adhesion layers discussed herein have similar dual-sided adhesive properties. Provided on first adhesion layer 12 is a first antireflection layer 13. First antireflection layer 13 is preferably a five-layered structure, for example, a laminated structure of silica (referred to as "$SiO_2$") having a refractive index of about 1.41 and titania (referred to as "$TiO_2$") having a refractive index of about 2.00, provided by repetitive sputtering. On the first antireflection layer 13, a first transparent conductive layer 14, such as ITO, is formed by sputtering. On ITO layer 14, very small dot spacers 15, such as of an insulating epoxy resin, are provided at regular intervals, and an insulating pattern 16 having a certain specific thickness is provided at the outer perimeter.

A second transparent conductive layer 18, such as ITO, is formed, such as by sputtering, on a bottom surface of a flexible transparent film 17, such as a biaxially oriented polyethylene terephthalate film about 0.175 mm thick. The second ITO layer 18 is disposed opposing the first ITO layer 14 with a certain space between the two ITO surfaces and with the insulating pattern 16 interposed between the two ITO surfaces.

A hard coat layer 19 of an acrylic resin, for example having a pencil hardness of 3H, is covers the upper surface of film 17 for protecting the film from damage by the pushing pen or finger. The TTP is connected to a certain outside circuit (not shown), well-known in the art, by a flexible wiring board 20. A wiring pattern 20A on the flexible wiring board is connected to the end sections of first ITO layer 14 and second ITO layer 18 via a connector 21, such as silver paste.

The transparent touch panel configured above operates in the same manner as conventional touch panels.

The TTP as configured above has a light transmittance of about 82%, and linearity in the position detection of about ±1.4%. The TTP demonstrated a change in linearity of less than about 0.1% after a durability test comprising writing one hundred thousand Japanese phonetic letters with a polyacetal pen having a tip radius of about 0.8 mm at a load of about 250 g. Even after about 500 hours on a shelf in a humid environment of about 60° C. at about 95% relative humidity, adhesion of first antireflection layer 13 and first ITO layer 14 to fixed substrate 11 was unaffected, and none of the characteristics, such as light transmittance, linearity in position detection, and durability against repetitive input operations, exhibited a change.

A TTP having dimensions of about 100 mm×about 100 mm, supported at the perimeter, was pressed at the center of the panel with a polyacetal pen having a tip radius of about 0.8 mm at a load of about 30 kg. Fixed substrate 11 did not break. A TTP in the present embodiment weighs about half that of the glass-substrate counterpart.

The above described TTP in the present embodiment, where the first ITO layer 14 has been formed on a fixed substrate 11 of a transparent resin, with the first adhesion layer 12 and the first antireflection 13 interposed, exhibits superior mechanical strength and high transmittance. First antireflection layer 13 reduces reflection of the light incident to respective boundary surfaces between fixed substrate 11 and first ITO layer 14, providing increased light transmittance. Because of the tight adhesion of first antireflection layer 13 and first ITO layer 14 to fixed substrate 11, the uniform electrical resistance of first ITO layer 14 is well maintained.

Thus, a TTP may be obtained in accordance with the present invention that is lightweight, that does not break easily, that provides improved visibility of a display disposed underneath the TTP, that has superior linearity in the detection of the pressed position, and that has excellent durability against repetitive input operations.

Figure 3:
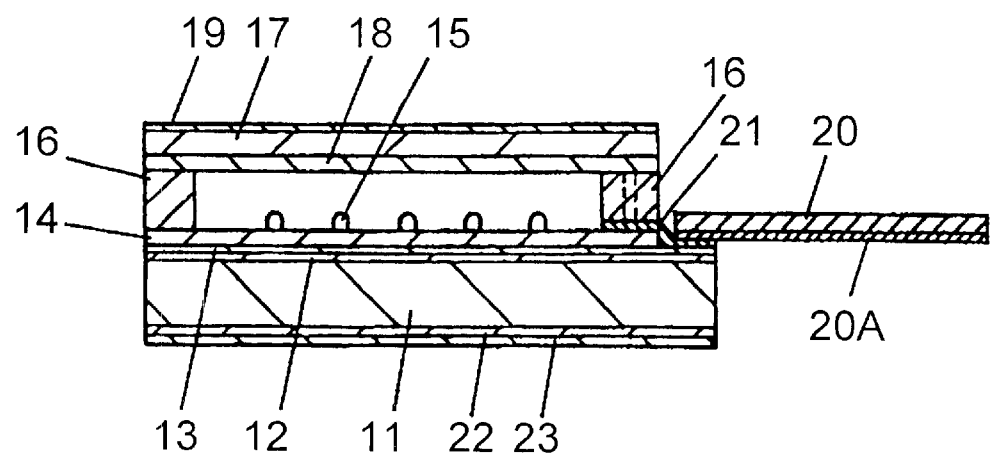
FIG. 3 is a sectional view showing another TTP in the first exemplary embodiment.

Furthermore, as shown in the sectional view FIG. 3, a second adhesion layer 22, such as of an epoxy modified acrylic resin may be formed on the bottom surface of fixed substrate 11, such as by printing an epoxy acrylate ink and curing it. Next, a second antireflection layer 23, such as the five-layered structure of $SiO_2$ and $TiO_2$ formed by repetitive sputtering described above, may be provided on second adhesion layer 22. These layers increase the overall transmittance of the TTP to about 85%, bringing about even greater further improvements in visibility.

Figure 4:
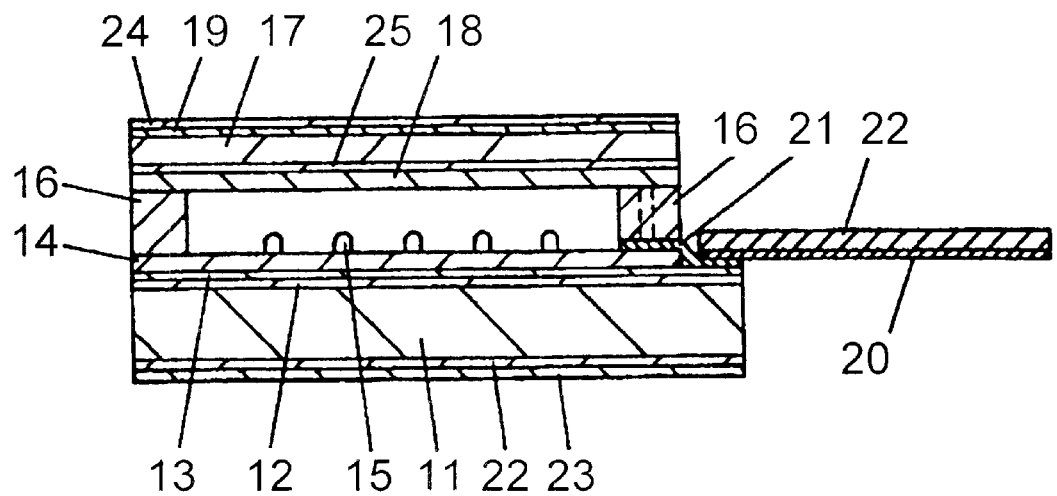
FIG. 4 is a sectional view showing a still other TTP in the first exemplary embodiment.

In an alternative embodiment, a hard coat layer 19, such as an acrylic resin having a pencil hardness of 3H, and a third antireflection layer 24, such as formed from a single layer about 0.10 $\mu$m thick of $SiO_2$ having a refractive index of about 1.41, may be provided, in that order, on the upper surface of film 17, as shown in the sectional view FIG. 4. A fourth antireflection layer 25, such as a single layer about 0.10 $\mu$m thick of $SiO_2$ having a refractive index of about 1.41, and a second ITO layer 18 may be provided on the bottom surface of film 17. Such a configuration improves the transmittance of the TTP to about 90%. Thus a significantly superior visibility may be attained despite the reduced process steps of layer formation.

Fixed substrate 11 may be a polycarbonate sheet as described above, or an acrylic resin sheet, a poly methyl methacrylate sheet, a polyolefin resin sheet, a polystyrene resin sheet, or the like may also be used. The fixed substrate 11 typically has a thickness of between about 0.5 mm to about 10 mm, preferably between about 0.7 mm to about 3 mm.

A polycarbonate fixed substrate as described above, typically has a bending modulus of about 24,000 kg/cm². Rigidity of the fixed substrate 11 may be increased further by the use of a resin having a higher bending modulus, such as but not limited to, "Arton" polyolefin resin by JSR, typically having a bending modulus of about 30,000 kg/cm² or "APO" polyolefin resin by Mitsui Chemical, typically having a bending modulus of about 32,000 kg/cm². The increased rigidity reduces bending of the TTP caused by the pressure of a pen or a finger, as a result, lowers the mechanical load transmitted to the display device disposed underneath the TTP. This is advantageous in reducing deformation of a display during operation and for assuring a clear and easy-to-see display.

A biaxially oriented polyethylene terephthalate film is generally used for film 17. Other films, such as but not limited to, biaxially oriented polyethylene naphthalate film, polycarbonate film, polyether sulphone film, polyarylate film, polyolefin film, and the like may also be used. The thickness of film 17 is typically between about 0.05 mm to about 0.4 mm, and preferably between about 0.1 mm to about 0.2 mm.

Preferred materials for first and the second adhesion layers 12 and 22 include, besides epoxy modified acrylic resin as described above, acrylic modified resin such as urethane acrylate, polyester acrylate, silicone acrylate, and the like; urethane modified resin containing tolylene diisocyanate, hexamethylene diisocyanate, and the like as the main component; and an epoxy modified resin containing bis-phenol A, bis-phenol F, and the like as the main component. The first and second adhesion layers 12 and 22 may be applied by, for example, printing or coating, and then curing.

An adhesion layer of $SiO_2$ having a refractive index of about 1.41 and a thickness of about a 0.05 $\mu$m to about 0.15 $\mu$m may also function as an antireflection layer. In this case, it is not necessary to provide an independent antireflection layer, and the manufacturing cost of a TTP may be reduced. A $SiO_2$ layer having a thickness less than about 0.05 $\mu$m or more than about 0.15 $\mu$m, may also be used as an adhesion layer, but typically does not provide the desired antireflection effect, and so typically still requires an independent antireflection layer. Adhesion layers comprising $SiO_2$ typically comprise silica formed at atmospheric pressure.

Alternative embodiments for the first through fourth antireflection layers 13, 23, 24, 25, respectively, in place of the earlier-described five-layered structure of $SiO_2$ and $TiO_2$ or the single layer of $SiO_2$, include but are not limited to a three-layered structure or a seven-layered structure formed by repetition of $SiO_2$ and $TiO_2$ layers, a three- to seven-layered structure formed by repetition of $SiO_2$ and ITO layers, and a layer about 0.1±0.05 $\mu$m thick of acrylic modified resin having a refractive index of about 1.45, such as but not limited to polymethyl methacrylate. These antireflection layers may be formed by physical processes, such as but not limited to sputtering, CVD (chemical vapor deposition), and the like, or by chemical processes, such as but not limited to printing of ink, dipping and pull-up from a solution, and the like.

Instead of the first transparent conductive layer 14 and the second transparent conductive layer 18 being ITO, transparent electrode materials such as but not limited to tin oxide ($SnO_2$), zinc oxide (ZnO), a thin film of gold, and a thin film of silver, may also be used.

Second Embodiment

Figure 5:
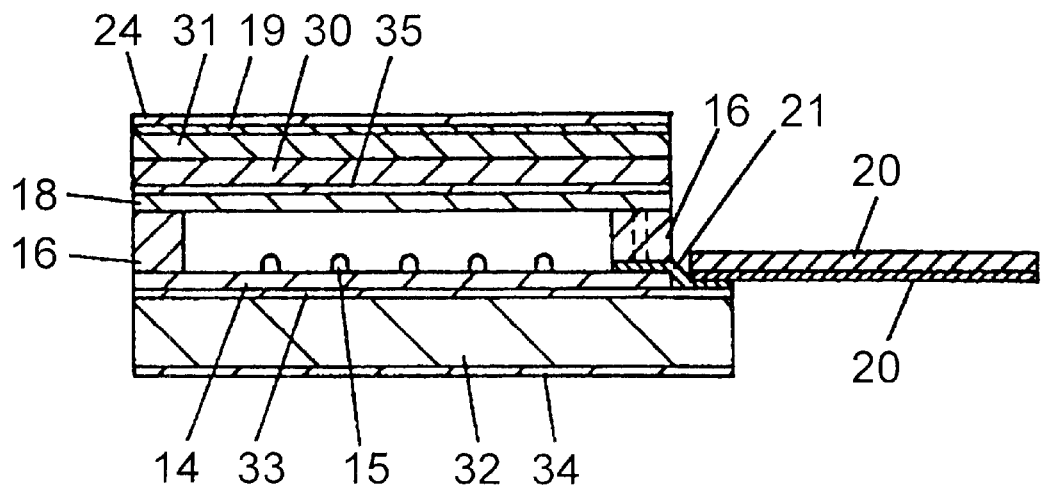
FIG. 5 is a sectional view of a TTP in a second exemplary embodiment of the present invention.

FIG. 5 is a sectional view of a transparent touch panel in a second exemplary embodiment of the present invention where a polarizing plate 31 is provided, in addition to the structure of the first embodiment, on the upper surface of the flexible film 30.

In FIG. 5, a fixed substrate 32, such as a polycarbonate sheet having low birefringence manufactured by a casting process for providing optical isotropy, has a first adhesion layer 33 on an upper surface thereof and a second adhesion layers 34 on a bottom surface thereof. Adhesion layers 33 and 34 are typically formed of a $SiO_2$ layer, typically about 0.10 $\mu$m thick, that functions also as an antireflection layer. The $SiO_2$ layer may be typically formed by dipping fixed substrate 32 in a solution containing silicone tetra-ethoxide as the main component, and then pulling up and drying the substrate at about 100° C. for about 30 min. A first transparent conductive layer 14, such as ITO, is disposed on the upper surface of the first adhesion layer 33, such as by a sputtering process.

On the bottom surface of film 30, which is typically a non-oriented, optically isotropic polycarbonate film, a fourth antireflection layer 35, such as $SiO_2$ layer about 0.10 $\mu$m thick having a refractive index of about 1.41, is provided, on which is disposed a second transparent conductive layer 18, such as ITO, formed, for example, by a sputtering process.

A polarizing plate 31 is provided on the upper surface of film 30, and a hard coat layer 19, such as an acrylic resin having a pencil hardness of 3H, is formed covering the upper surface of polarizing plate 31. Hard coat layer 19 is for protects polarizing plate 31 from getting scratched by a pushing pen or finger during input operations. In addition, a third antireflection layer 24, such as a single layer about 0.10 $\mu$m thick of $SiO_2$ having a refractive index of about 1.41, is provided on hard coat layer 19. This third antireflection layer reduces the light reflection at the boundary surface between polarizing plate 31 and the air.

The above-configured TTP operates in the same was as in the first embodiment, and therefore a detailed description is omitted here. Light transmittance of the TTP of this embodiment decreases to less than half of that in the first embodiment because of the effect of polarizing plate 31. At the same time, the light reflection can also be decreased to less than half. Because the polarizing plate is placed on the upper surface of the flexible film of the TTP, the normal process of attaching a polarizing plate on the display surface of the LCD device (not shown) disposed underneath the TTP, is unnecessary. By placing the polarizing plate on the upper surface of the flexible film of the TTP or on the operating surface, the amount of light reflected within the TTP can be reduced to less than half as compared to the first embodiment. Because the polarizing plate in the TTP eliminates the need for the polarizing plate normally attached to the LCD device, the amount of light incident to the LCD device is unchanged and the overall cost for manufacturing the TTP apparatus including an LCD device is reduced. In particular, in the conventional manufacture of an LCD device, a polarizing plate is attached individually to the LCD panel, whereas in the present embodiment, the process for laminating the polarizing plate 31 and the film 30 can be conducted continuously, which enables the manufacturing cost to be lowered.

The advantage described above is even more remarkable when a TTP is used in combination with a reflective type LCD device. When a reflective type LCD device is combined with a TTP of this embodiment, the process for laminating a polarizing plate to the LCD panel can be completely eliminated in the production of the LCD devices.

Furthermore, by providing film 30 with a polarizing function, the process for attaching polarizing plate 31 to film 30 may also be eliminated. Film 30 may be provided with a polarizing function by, for example, adding an organic dye in the plastic material to be mixed together, and drawing the dye within the film into a monoaxial orientation in the process of film formation.

As described in the foregoing, the present embodiment provides a TTP that is superior in the linearity of position detection at input operation, that has high durability against repetitive input operations, mechanical shocks and unexpected excessive loads, and that is lightweight with remarkable visibility and a significantly reduced amount of light reflection. The present invention provides such TTPs at a low cost.

For fixed substrate 32, besides the polycarbonate sheet used in the earlier example, any transparent plastic sheet that is optically almost-isotropic and having small birefringence is suitable, such as but not limited to a polyarylate sheet, a polyolefin sheet, and the like manufactured by a casting method.

For film 30, besides the polycarbonate film described above, any a transparent film that is optically almost-isotropic and that has small birefringence is suitable, such as but not limited to a polyarylate film, a polyether sulphone film, a polyolefin film, and the like.

Third Embodiment

Figure 6:
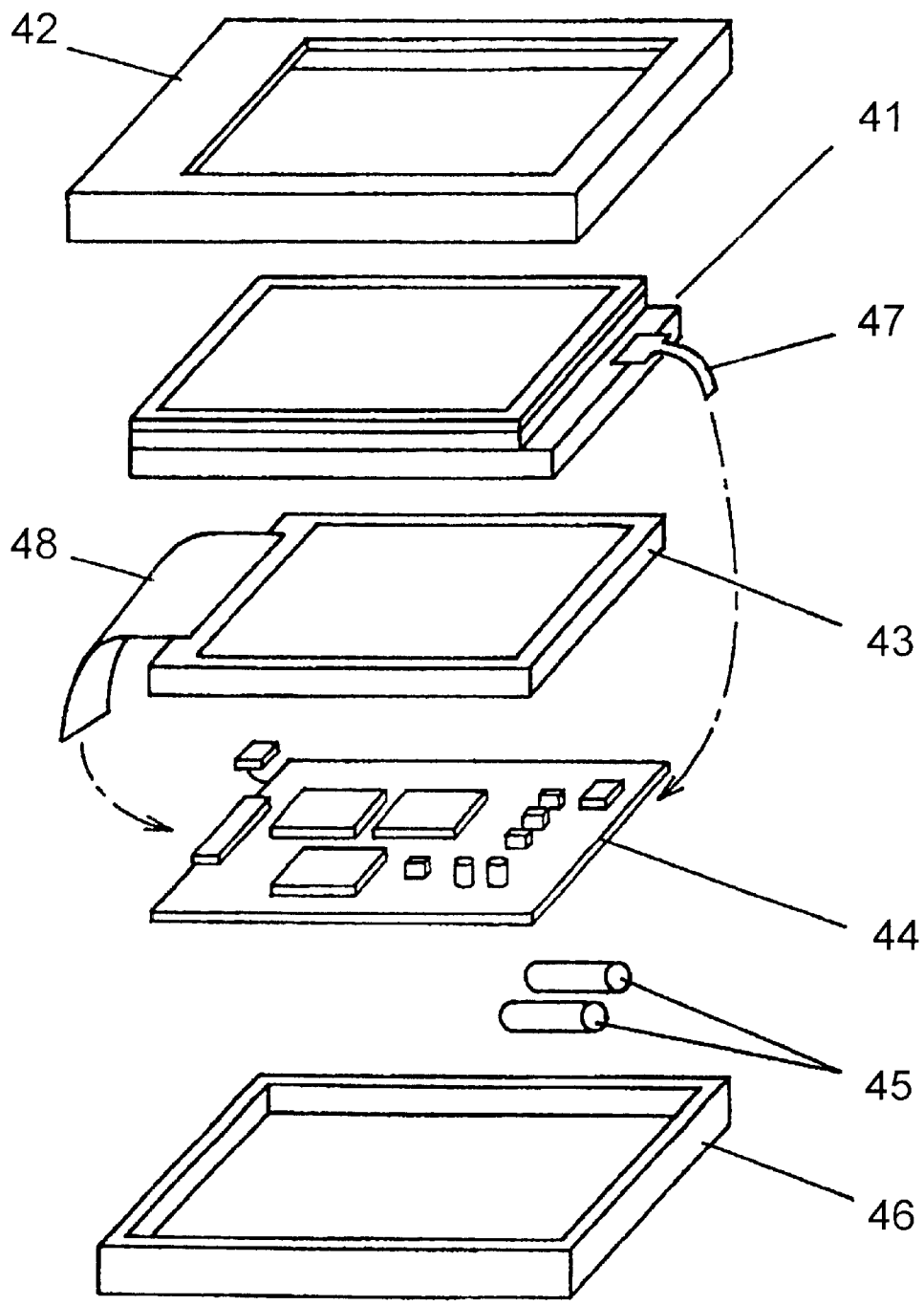
FIG. 6 is an exploded perspective view of an electronic apparatus in a third exemplary embodiment of the present invention.
Figure 7:
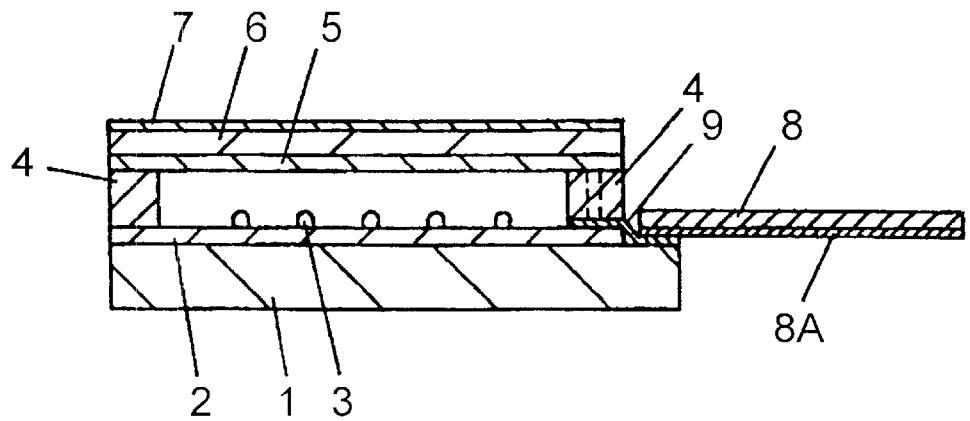
FIG. 7 is a sectional view of a conventional TTP of the prior art.
Figure 8:
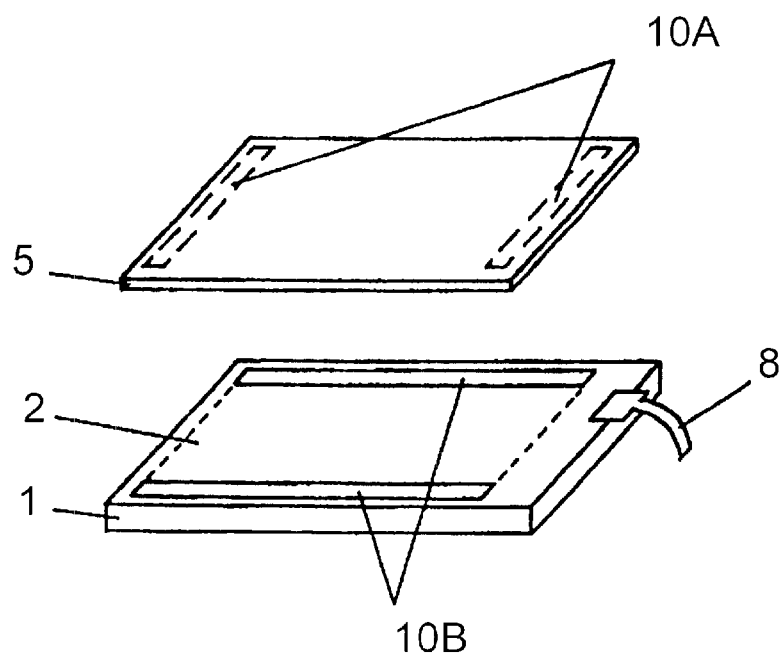
FIG. 8 is a perspective view showing a portion of the conventional TTP of the prior art.

FIG. 6 is an exploded perspective view of a handheld computer in accordance with a third exemplary embodiment of the present invention. In FIG. 6, a TTP 41 attached on the bottom surface of an upper case 42 is provided on an LCD device 43. A control circuit 44 formed of electronic components such as central processing unit, memory device, etc. and a battery 45 for supplying power to the control circuit 44 are supported by the upper case 42 and a bottom case 46. The TTP 41 and the LCD device 43 are coupled with the control circuit 44 by respective flexible wiring boards 47, 48 provided therefrom.

A handheld computer in the present embodiment is put into operation by a pressing on a TTP 41 with a pen or a finger at a designated position representing an operational function, such as for example, power ON/OFF, selection of various software available, performing functions of a selected software, and the like, where icons or text corresponding to such operational functions are displayed on the LCD device 43. The LCD device is configured to present various displays corresponding to the operational functions related to operation of the handheld computer as provided by the control circuit containing the central processing unit, the memory device, and the like.

A handheld computer in the present embodiment using a TTP of this invention, among other items, has a sufficient physical strength to withstand the shock of a drop or an excessive load given unexpectedly on the computer while a user is carrying it. The handheld computer is lightweight. Visibility through the transparent touch panel is remarkably improved, and is particularly well suited for such complicated and large capacity information displays as letters, pictures, drawings, photos, and the like. Also, the linearity in the input position detection is superior, and the durability against repetitive input operations is high. Thus a handy and easy-to-use handheld computer can be obtained in accordance with the present embodiment of the present invention.

The present invention uses a transparent plastic sheet for the fixed substrate. The fixed substrate has an adhesion-facilitating layer interposed between the substrate and each of the antireflection and ITO layers. The adhesion-facilitating layer not only improves the adhesion of the antireflection layer and the first ITO layer to the fixed substrate, but it also improves the evenness of the electrical resistance in the first ITO layer. Furthermore, the light transmittance of the TTP is also increased. By providing a polarizing plate on the upper surface of the flexible film on which the second ITO layer is disposed, light reflection is significantly reduced, and the electronic apparatus can be manufactured at a lower cost. Thus the present invention provides a low-cost, lightweight, portable electronic apparatus having high physical strength to resist shock or excessive loads, having outstanding visibility of the display device incorporated in the body, having superior linearity in position detection on the display screen, and having high durability physical strength against repetitive input operations conducted through the display screen.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A transparent touch panel comprising:
   a fixed substrate comprising a transparent plastic;
   a first adhesion layer disposed on said fixed substrate, the first adhesion layer having adhesive properties on both an upper surface and a lower surface of said adhesion layer;
   a first antireflection layer disposed on said first adhesion layer;
   a first transparent conductive layer disposed on said first antireflection layer;
   a second transparent conductive layer having a lower surface opposed to and spaced apart from said first transparent conductive layer; and
   a flexible transparent film disposed on an upper surface of said second transparent conductive layer.

2. The transparent touch panel of claim 1, further comprising:
   a second adhesion layer having adhesive properties at both an upper surface and a lower surface of said adhesion layer; and
   a second antireflection layer disposed on a bottom surface of said fixed substrate.

3. The transparent touch panel of claim 2, wherein said first adhesion layer and said second adhesion layer each comprises as a main component silica formed under atmospheric pressure.

4. The transparent touch panel of claim 1, further comprising a second adhesion layer on a bottom surface of said fixed substrate, said second adhesion layer having adhesive properties at both an upper surface and a lower surface of said adhesion layer and having antireflective properties.

5. The transparent touch panel of claim 1, further comprising on an upper surface of said flexible transparent film:
   a hard coat layer; and
   a third antireflection layer.

6. The transparent touch panel of claim 1, wherein said flexible transparent film further comprises a fourth antireflection layer and the second transparent conductive layer at a bottom surface of said flexible transparent film.

7. The transparent touch panel of claim 1, further comprising a polarizing plate on the upper surface of said flexible transparent film.

8. The transparent touch panel of claim 7, further comprising a hard coat layer and a third antireflection layer on the upper surface of said polarizing plate.

9. The transparent touch panel of claim 1, wherein said flexible transparent film comprises a polarizing film.

10. The transparent touch panel of claim 1, wherein said first adhesion layer contains as a main component a resin selected from the group consisting of: an acrylic resin, an urethane resin, an epoxy resin, and a combination thereof.

11. The transparent touch panel of claim 1, wherein said first antireflection layer comprises a laminated layer comprising a layer of low refractive index and a layer of high refractive index.

12. The transparent touch panel of claim 1, wherein at least one of said first antireflection layer or said first adhesion layer is a transparent layer having a thickness of not less than about 0.05 μm and not more than about 0.15 μm and having a refractive index not more than about 1.5.

13. The transparent touch panel of claim 1, wherein the fixed substrate comprises a resin having a bending modulus of not less than about 30,000 kg/cm$^2$.

14. An electronic apparatus comprising at least a control circuit, a display device, and a transparent touch panel disposed on a display surface of said display device, wherein said transparent touch panel comprises:

a fixed substrate comprising a transparent plastics;

a first adhesion layer disposed on said fixed substrate, said first adhesion layer having adhesive properties at both an upper surface and a lower surface of said first adhesion layer;

a first antireflection layer disposed on said first adhesion layer;

a first transparent conductive layer disposed on said first antireflection layer;

a second transparent conductive layer opposed to and spaced apart from said first transparent conductive layer; and a flexible transparent film disposed on an upper surface of said second transparent conductive layer.

15. The electronic apparatus of claim 14, wherein said display device is a reflection type LCD device.

16. The electronic apparatus of claim 14, wherein a polarizing plate is provided on an operating surface of said transparent touch panel.

* * * * *